3,600,343
PROCESS FOR THE MANUFACTURE OF CO-
POLYMER DISPERSIONS OF HIGH PIGMENT
TOLERANCE
Michael Lederer and Siegfried Sommer, Frankfurt am
Main, Germany, assignors to Farbwerke Hoechst Ak-
tiengesellschaft vormals Meister Lucius & Bruning,
Frankfurt am Main, Germany
No Drawing. Continuation of application Ser. No.
586,392, Oct. 13, 1966. This application July 28,
1969, Ser. No. 863,401
Int. Cl. C08f 1/13, 15/40
U.S. Cl. 260—17                                    6 Claims

ABSTRACT OF THE DISCLOSURE

Latices of interpolymers of vinyl chloride, vinyl esters of branched aliphatic carboxylic acids, and acrylic acid esters which show unusual compatibility with dry pigments are prepared by polymerizing the monomer mixture in an aqueous solution containing hydroxyethyl cellulose of 37 to 50% oxyethylene content, an oxyethylated alkyl phenol, and a second anionic emulsifier such as an alkylsulfate or alkylsulfonate salt.

---

This application is a continuation of Ser. No. 586,392, filed Oct. 13, 1966, now abandoned.

The present invention relates to a process for the manufacture of aqueous copolymer dispersions of vinyl chloride, vinyl esters of branched aliphatic carboxylic acids and acrylic acid esters, which dispersions are distinguished by a good compatibility with pigments and a good freeze resistance and which in the pigmented state have an excellent stability.

By compatibility with pigments there is to be understood the compatibility with dry pigments, especially with dry $TiO_2$, which means that after the addition of the dry pigments the dispersion should not coagulate. It is known that dispersion paints are generally compatible with pigments when the pigments are added in the form of aqueous pastes, occasionally with concomitant use of pigment distributors.

Coagulation often occurs when dry pigments are stirred into the dispersion paint. Dispersions containing ionic emulsifiers are especially sensitive. In industry, however, the use of dry pigments for pigmenting plastics dispersions has found wide application.

Copolymer dispersions of vinyl chloride with vinyl esters are especially sensitive to the addition of dry $TiO_2$. The sensibility is further increased if the dispersion additionally contains a plasticizer.

In order to improve the freeze resistance of copolymer dispersions various measures have been proposed, for example the incorporation by polymerization of a small amount of an unsaturated carboxylic acid. This measure detrimentally affects, however, the capacity to absorb water of the coating films. On the other hand, it is known that with the use of hydroxyethyl cellulose and a non-ionic emulsifier, dispersions are obtained which are not resistant to sub-zero temperatures and unstable towards electrolytes. With the use of a polyvinyl alcohol as dispersing agent freeze stable dispersions are obtained, but the plasticizer-containing coatings are milky and strongly inhomogeneous. Moreover, the coatings absorb a high quantity of water.

The present invention provides a process for the manufacture of aqueous copolymer dispersions of vinyl chloride, vinyl esters of branched aliphatic carboxylic acids and acrylic acid esters with 4 to 10 carbon atoms in the alcohol component in which the aforesaid disadvantages are substantially or entirely avoided. According to the invention the monomer mixture is polymerized in an aqueous solution of (a) hydroxyethyl cellulose having a $OC_2H_4$ content of 37 to 50%, preferably 40 to 47%, (b) an oxyethylated alkyl phenol, preferably nonyl phenol, with 6 to 25, advantageously 10 to 15 $OC_2H_4$ units in the molecule, and (c) an ionic emulsifier, advantageously sodium lauryl sulfate. The copolymer dispersions obtained have a very good compatibility with pigments and a high freeze resistance and in the pigmented state they have excellent storing properties.

According to a preferred mode of execution the hydroxyethyl cellulose is used in an amount of 1 to 3, advantageously a viscosity in the range of from 5 to alkyl phenol is used in an amount of 2 to 6, advantageously 2.5 to 4% by weight and the ionic emulsifier is used in an amount of 0.01 to 0.1, advantageously 0.04 to 0.08% by weight, all percentages being calculated on the monomer mixture. The hydroxyethyl cellulose has advantageouslyl a viscosity in the range of from 5 to 400 centipoises, measured in a 2% aqueous solution. Suitable ionic emulsifiers are, for example, the alkali metal salts of monoalkylsulfuric acids and alkylsulfonic acids, especially those having 8 to 18 carbon atoms. Sodium salts and more particularly sodium lauryl sulfate are preferred.

It has been surprising that copolymer dispersions of vinyl chloride with vinyl esters of branched aliphatic carboxylic acids, especially vinyl isobutyrate, and acrylic acid esters with 4 to 10 carbon atoms in the alcohol component, having the aforesaid advantageous properties can only be obtained with the use of a definite hydroxyethyl cellulose having a $OC_2H_4$ content of 37 to 50% in combination with a definite oxyethylated alkyl phenol containing 6 to 25 $OC_2H_4$ units in the molecule, and a minor amount of an ionic emulsifier. When, for example, in the specified dispersing system the defined hydroxyethyl cellulose is replaced by a hydroxyethyl cellulose having a $OC_2H_4$ content of 20 to 35% and a viscosity of 5 to 300 centipoises, determined in a 2% aqueous solution, considerable amounts of coagulate are formed in the dispersion on adding dry $TiO_2$ and the dispersion has a moderate freeze resistance.

Dispersions still having a good compatibility with pigments can be prepared, for example, by combining a hydroxyethyl cellulose with 35% of $OC_2H_4$ and a hydroxyethyl cellulose with 41% of $OC_2H_4$ provided that the mean $OC_2H_4$ content is raised to at least 37%. When, however, two dispersions which have been prepared separately with the two hydroxyethyl celluloses specified above, are subsequently mixed, objectionable dispersions are obtained.

Vinyl esters of branched chain carboxylic acids suitable in the copolymerization are advantageously those having 4 to 19 carbon atoms, vinyl isobutyrate being preferred. The proportion of vinyl ester to vinyl chloride before copolymerization advantageously amounts to 30:95 to 70:5% by weight.

The alcohol component of the acrylic acid ester to be used has 4 to 10 carbon atoms and may be straight or branched. There are mentioned by way of example butyl, isobutyl, n-hexyl, isohexyl, n-octyl, 2-ethylhexyl, nonyl, and decyl acrylate. 2-ethylhexyl acrylate is especially suitable. The acrylic acid esters are preferably used in an amount in the range of from 1 to 50, more preferably 3 to 30%, calculated on the total weight of the monomers.

As catalysts the water-soluble derivatives of hydrogen peroxide are preferably used, for example potassium persulfate, ammonium persulfate or the mixed peroxide of cyclohexyl carbonate and potassium sulfate, if desired in combination with reducing substances. It is also possible to use hydrogen peroxide in combination with a reducing agent such as ascorbic acid or sodium formaldehyde sulfoxylate. The total amount or a partial amount of the catalyst can be first introduced into the reaction vessel. In the latter case the remaining amount of the catalyst is added in the course of polymerization. To the polymerization batch there may also be added substances known for their ability to influence the molecular size (so-called regulators), for example aldehydes, mercaptans, halohydrocarbons and the like. Salts having a buffering action may be added, too, for example sodium bicarbonate and/or sodium acetate.

It is expedient to carry out polymerization at a temperature in the range of from 40 to 120° C., advantageously 65 to 95° C. Polymerization is carried out in an autoclave which is, in general, first charged with the aqueous medium and a partial amount of the catalyst. The mixture is then heated to the required polymerization temperature, whereupon part of the monomer mixture is added. After the beginning of polymerization the remaining amount of the monomer mixture is metered in uniformly. The remainder of the vinyl ester which has not polymerized is completely polymerized wtih a redox system.

The tendency to form films of the copolymers largely depends on the content of vinyl chloride. It is, therefore, necessary to add a plasticizer to dispersions containing 30% and more vinyl chloride if they are to be used as paints. Suitable plasticizers are, for example, diesters of phthalic acid or esters of phosphoric acid, tricresyl phosphate being particularly advantageous.

The films made from dispersions prepared with the use of acrylic acid esters do not possess any disadvantage possibly resulting from a plasticizer migration. They are distinguished by improved mechanical properties, a good freeze resistance and an excellent stability to saponification. Moreover, the water absorption of the coatings made therefrom is low.

Copolymer dispersions of vinyl chloride/vinyl isobutyrate/acrylic acid ester are useful in the production of flexible coatings which have improved stability properties compared with coatings from dispersions of vinyl chloride/vinyl isobutyrate alone containing an external plasticizer. Comparative data are given in the following table. The plasticizer used is a mixture of tricresyl phosphate and hexylene glycol.

of hydroxyethyl cellulose with a $OC_2H_4$ content of 41% and a viscosity of 163 centipoises (determined in a 2% aqueous solution), 2.5 parts of an oxyethylated nonyl phenol with 10 $OC_2H_4$ units per molecule, 0.08 part of sodium lauryl sulfate, 0.01 part of $NaHCO_3$, and 0.2 part of potassium persulfate was heated at 70° C. with the exclusion of air and 10 parts of a monomer mixture consisting of vinyl chloride, vinyl isobutyrate and 2-ethylhexyl acrylate (proportion 32:20) were forced in. After the beginning of polymerization further 90 parts of the monomer mixture were metered in over a period of 8 hours. A solution of 0.03 part of ammonium persulfate was added and the polymerization mixture was heated at 90–95° C. After the pressure had fallen, the mixture was cooled and polymerization was terminated with the aid of a redox system of $H_2O_2$/ascorbic acid. The conversion amounted to 99.5–99.9%.

The dispersion could be well pigmented. When dry $TiO_2$ was added, less than 0.02% of coagulate was obtained.

When a comparative polymerization was carried out with a hydroxyethyl cellulose containing only 35% of $OC_2H_4$ units, the dispersion had a poor compatibility with dry $TiO_2$ and 3% of coagulate were formed.

A comparison of the mechanical strength of the coating with that of an externally plasticized dispersion is made in the table.

EXAMPLE 2

The experiment was carried out as described in Example 1. Instead of hydroxyethyl cellulose having a viscosity of 163 centipoises, a hydroxyethyl cellulose with a viscosity of 18 centipoises was used. The dispersion obtained was well compatible with pigments. With the addition of dry $TiO_2$ less than 0.02% of coagulate was formed. The water absorption of a dispersion coating was 6%.

EXAMPLE 3

A monomer mixture of vinyl chloride/vinyl isobutyrate/2-ethylhexyl acrylate in the composition 36:54:10 was polymerized as described in Example 1.

The dispersion obtained was well compatible with pigments. When adding dry $TiO_2$, less than 0.02% of coagulate was formed. A coating from said dispersion had an improved mechanical strength as compared with a coating

TABLE

| Composition of copolymers, percent by weight | | | | Mechanical properties | |
|---|---|---|---|---|---|
| Vinyl chloride | Vinyl isobutyrate | 2-ethylhexyl-acrylate | Plasticizer | Tensile strength, kg./m.³ | Elongation at break, percent |
| 33.4 | 50 | | 16.6 | 18 | 470 |
| 34.5 | 51.7 | | 13.8 | 14 | 424 |
| 36 | 54 | 10 | | 92 | 280 |
| 34 | 51 | 15 | | 38 | 400 |
| 32 | 48 | 20 | | 27 | 420 |

The coatings made from the dispersions have a low water absorption. The dispersions possess a good freeze resistance and an excellent stability to saponification. When a dispersion is treated with a 1-molar sodium hydroxide solution at 50° C., only 1 to 1.5% of saponification can be observed after 8 hours.

The dispersions obtained have a very good compatibility with dry $TiO_2$.

The dispersions prepared by the process according to the invention are suitable for producing weather resistant coats and for coating the surface of films and/or fabrics.

The following examples serve to illustrate the invention but they are not intended to limit it thereto, the parts being by weight unless otherwise stated.

EXAMPLE 1

In a polymerization vessel provided with stirrer and inserts (baffles) a solution of 100 parts of water, 2 parts from a dispersion of vinyl chloride/vinyl isobutyrate alone containing 7% of plasticizer.

EXAMPLE 4

A monomer mixture of vinyl chloride/vinyl isobutyrate/2-ethylhexyl acrylate in the composition of 60:30:10 was polymerized as described in Example 1. The dispersion obtained had a good compatibility with pigments. When adding dry $TiO_2$, less than 0.01% of coagulate was formed.

EXAMPLE 5

A monomer mixture of vinyl chloride/vinyl isobutyrate/butyl acrylate in the composition 36:54:10 was polymerized as described in Example 1. A dispersion was obtained having a good compatibility with pigments. When adding dry $TiO_2$ less than 0.01% of coagulate was formed.

We claim:
1. A process for the manufacture of an aqueous terpolymer dispersion of vinyl chloride, vinyl ester of a branched aliphatic carboxylic acid and an acrylic acid ester with 4 to 10 carbon atoms in the alcohol component wherein said monomer mixture is polymerized in an aqueous solution containing in weight percent of the monomer mixture, (a) 1 to 3 percent hydroxyethyl cellulose with a $OC_2H_4$ content of 37% to 50%, (b) 2 to 6 percent oxyethylated alkyl phenol with 6 to 25 $OC_2H_4$ units in the molecule and (c) 0.01 to 0.1 percent sodium lauryl sulfate.

2. The process defined in claim 1 wherein the aqueous solution contains a hydroxyethyl cellulose with a $OC_2H_4$ content of 40 to 47% and an oxyethylated alkylphenol with 10 to 15 $OC_2H_4$ units in the molecule.

3. The process defined in claim 1 wherein the oxyethylated alkyl phenol is nonyl phenol.

4. The process defined in claim 1 wherein the hydroxyethyl cellulose is used in an amount of 1.5 to 2.5% by weight, the oxyethylated alkyl phenol is used in an amount of 2.5 to 4% by weight and the sodium lauryl sulfate is used in an amount of 0.04 to 0.08% by weight, all percentages being calculated on the monomer mixture.

5. The process defined in claim 1 wherein the proportion by weight of vinyl ester to vinyl chloride before copolymerization is in the range of from 30 to 95 to 70 to 5.

6. The process defined in claim 1 wherein the acrylic acid ester is used in an amount of 1 to 50% by weight, calculated on the total weight of the monomers.

References Cited

UNITED STATES PATENTS

| | | | |
|---|---|---|---|
| 3,320,056 | 6/1967 | Vona et al. | 260—17 |
| 3,347,805 | 10/1967 | Scatena et al. | 260—17 |
| 3,370,031 | 2/1968 | Grommers et al. | 260—29.6 |
| 3,390,109 | 6/1968 | Reverdin et al. | 260—17 |

FOREIGN PATENTS

| | | | |
|---|---|---|---|
| 1,003,105 | 9/1965 | Great Britain | 260—29.6 |

OTHER REFERENCES

Encyclopedia of Polymer Science & Technology, vol. 3, pp. 513–514, Interscience, 1964.

WILLIAM H. SHORT, Primary Examiner

E. A. NIELSEN, Assistant Examiner

U.S. Cl. X.R.

260—29.6T, 80.81

UNITED STATES PATENT OFFICE
CERTIFICATE OF CORRECTION

Patent No. 3,600,343          Dated August 17, 1971

Inventor(s) Lederer and Sommer

It is certified that error appears in the above-identified patent and that said Letters Patent are hereby corrected as shown below:

In the Heading, after "863,401" insert --claims priority, application in Germany, June 11, 1966, F 49,445.--

Signed and sealed this 11th day of January 1972.

(SEAL)
Attest:

EDWARD M. FLETCHER, JR.       ROBERT GOTTSCHALK
Attesting Officer      Acting Commissioner of Patents